UNITED STATES PATENT OFFICE.

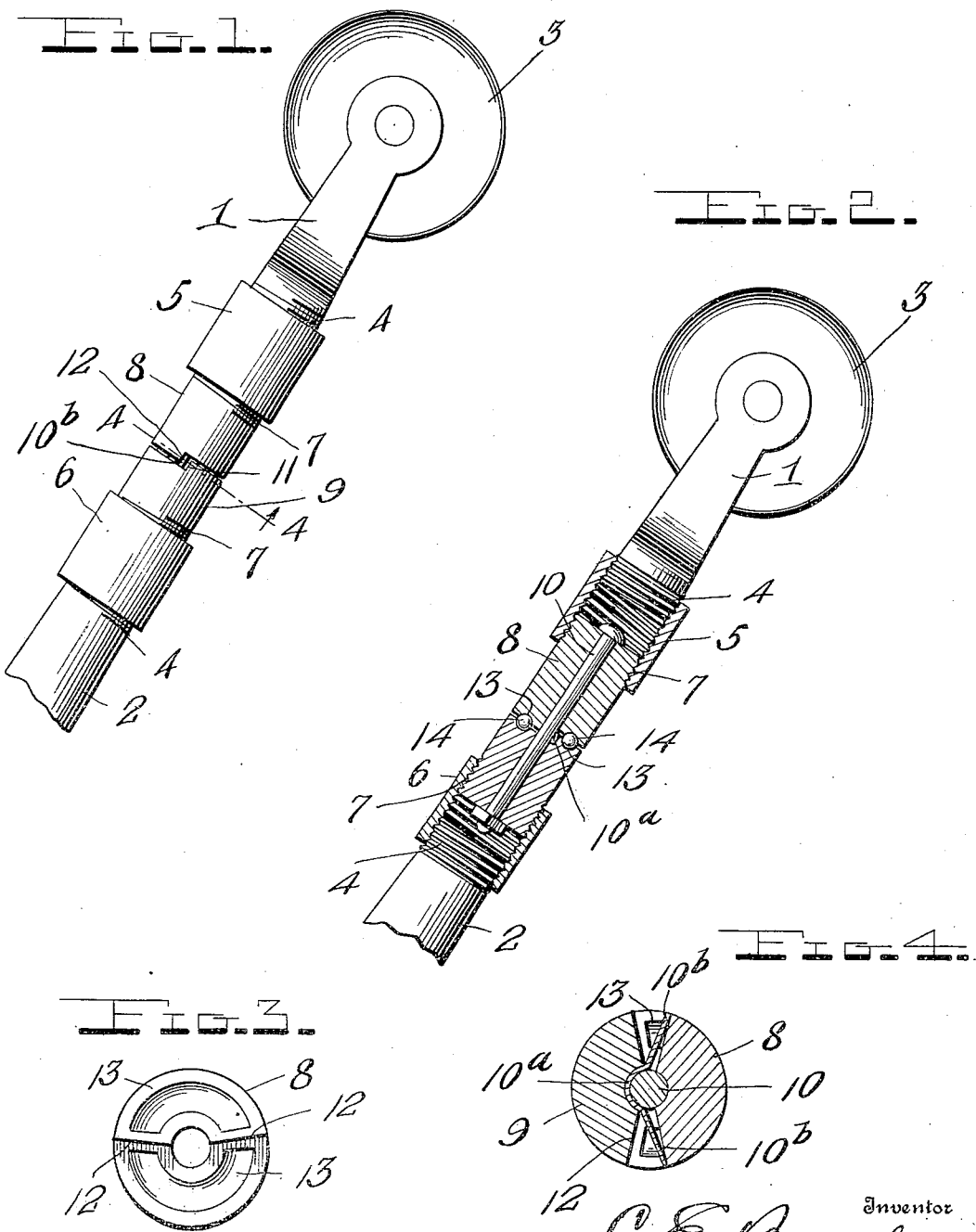

CHARLES E. BRADFORD, OF LAKEVIEW, WASHINGTON.

TROLLEY-POLE.

960,152.  Specification of Letters Patent.  Patented May 31, 1910.

Application filed August 24, 1909. Serial No. 514,429.

*To all whom it may concern:*

Be it known that I, CHARLES E. BRADFORD, a citizen of the United States, residing at Lakeview, in the county of Pierce and State of Washington, have invented certain new and useful Improvements in Trolley-Poles, of which the following is a specification, reference being had to the accompanying drawings.

This invention relates to improvements in trolley poles.

The object of the invention is to provide a simple and practical pivotal connection between two sections of a trolley pole, whereby the upper section carrying the trolley wheel will be allowed to have a limited lateral swinging movement so that the trolley wheels will be less liable to jump off of the wire.

With the above and other objects in view, the invention consists of the novel features of construction and the combination and arrangement of parts hereinafter fully described and claimed, and illustrated in the accompanying drawings, in which—

Figure 1 is a side elevation of a trolley pole constructed in accordance with the invention; Fig. 2 is a longitudinal section; Fig. 3 is an end view of one of the two joint members; and Fig. 4 is a detail section taken on the plane indicated by the line 4—4 in Fig. 1.

The embodiment of the invention illustrated in the drawings is in the form of an attachment adapted to be applied to an ordinary trolley pole by cutting it in two to provide upper and lower sections 1, 2. While the invention may be interposed at any point throughout the length of the pole, it is preferably disposed adjacent to the forked upper end which carries the trolley wheel 3. After the sections 1, 2 have been formed they are externally screw threaded as at 4 to receive two screw threaded coupling sleeves 5, 6 and to the other ends of which latter are screwed the threaded ends 7 of two joint members 8, 9. The latter are of tubular cylindrical form and are united by a pivot bolt 10 which extends through them, as clearly shown in Fig. 2 of the drawing. The upper joint member 8 has a limited rotary or oscillatory movement with respect to the member 9, the same being effected by cutting away a little more than half of the opposing ends of the two members to provide upon them stop shoulders 11, 12. Between these cut away or shouldered ends of the two members is arranged a leaf spring 10$^a$ having a curved central portion to extend partly around the pivot 10, and angular ends 10$^b$ arranged between said shoulders as clearly shown in Fig. 4. This spring will yieldably maintain the wheel in proper position. If desired, the opposing ends of the two members may be formed with grooves or race-ways 13 to receive antifriction bearing balls 14.

In operation, it will be seen that owing to the limited lateral movement which the upper trolley pole section 2 will have by reason of the improved joint or connection, the trolley wheel will be allowed to follow the wire and will be less liable to jump off of the same when the car makes a turn and when it swings laterally or sidewise.

Having thus described the invention what is claimed is:

1. The combination with a trolley pole having two sections, of joint members having their opposing ends cut away to form shoulders whereby said members may have a limited lateral oscillatory movement with respect to each other, a longitudinal pivot uniting said members, a leaf spring having its central portion secured and its end portions free and projecting between the shouldered portions of said members, and means connecting said members to the trolley pole sections.

2. The combination with a trolley pole having two sections, of two tubular joint members having their opposing ends cut away to form shoulders whereby said members will have a limited oscillatory movement with respect to each other, a pivot extending from said members, a leaf spring having a curved central portion to engage the pivot, and projecting ends arranged between the shouldered portions of said members, and means connecting said members to the trolley pole sections.

In testimony whereof I hereunto affix my signature in the presence of two witnesses.

CHARLES E. BRADFORD.

Witnesses:
  GEO. TIBBITS,
  D. L. GARLICK.